United States Patent [19]

Nair et al.

[11] Patent Number: 5,657,931
[45] Date of Patent: Aug. 19, 1997

[54] STABLE AQUEOUS SOLID PARTICLE DISPERSIONS

[75] Inventors: Mridula Nair, Penfield; Mary Christine Brick; Lloyd Anthony Lobo, both of Webster; Gary Norman Barber, Penfield, all of N.Y.

[73] Assignee: Eastman Kodak Company, Rochester, N.Y.

[21] Appl. No.: 445,321

[22] Filed: May 19, 1995

Related U.S. Application Data

[62] Division of Ser. No. 228,971, Apr. 18, 1994, abandoned.

[51] Int. Cl.$^6$ .................... B02C 19/00; B02C 19/12
[52] U.S. Cl. .................... 241/21; 241/27
[58] Field of Search .................... 241/21, 20, 27, 241/29

[56] References Cited

U.S. PATENT DOCUMENTS

| | | | |
|---|---|---|---|
| 2,378,283 | 6/1945 | Bucher | 241/22 |
| 2,844,486 | 6/1958 | Lamar | 106/308 |
| 3,030,370 | 4/1962 | Jackson | 260/279 |
| 3,593,927 | 7/1971 | Neill | 241/16 |
| 3,911,091 | 10/1975 | Karam et al. | 241/27 X |
| 3,912,517 | 10/1975 | Van Poucke et al. | 96/100 |
| 3,947,287 | 3/1976 | Belde et al. | 106/308 |
| 3,966,655 | 6/1976 | Kovacs et al. | 260/29.2 |
| 4,006,025 | 2/1977 | Swank et al. | 96/129 |
| 4,245,993 | 1/1981 | Kirner et al. | 8/664 |
| 4,284,709 | 8/1981 | Tomka et al. | 430/637 |
| 4,294,916 | 10/1981 | Postle et al. | 430/522 |
| 4,294,917 | 10/1981 | Postle et al. | 430/522 |
| 4,369,040 | 1/1983 | Kirner et al. | 8/527 |
| 4,427,810 | 1/1984 | Chisvette et al. | 524/8 |
| 4,522,654 | 6/1985 | Chisvette et al. | 106/288 |
| 4,523,923 | 6/1985 | Buchel et al. | 8/524 |
| 4,665,107 | 5/1987 | Micale | 523/105 |
| 4,725,394 | 2/1988 | Micale | 523/105 |
| 4,740,370 | 4/1988 | Farniarz et al. | 424/61 |
| 4,900,653 | 2/1990 | Factor et al. | 430/522 |
| 4,940,654 | 7/1990 | Diehl et al. | 430/522 |
| 5,071,076 | 12/1991 | Chagnon et al. | 241/21 |
| 5,074,887 | 12/1991 | Koci et al. | 8/527 |
| 5,087,649 | 2/1992 | Wegner et al. | 524/30 |
| 5,104,776 | 4/1992 | Bagchi et al. | 430/546 |
| 5,135,844 | 8/1992 | Bagchi et al. | 430/637 |
| 5,145,684 | 9/1992 | Liversedge et al. | 424/489 |
| 5,154,361 | 10/1992 | Willoughby | 241/16 |
| 5,300,394 | 4/1994 | Miller et al. | 430/137 |
| 5,360,695 | 11/1994 | Texter | 430/546 |
| 5,377,844 | 1/1995 | Hwang | 241/20 X |
| 5,401,623 | 3/1995 | Texter | 430/546 |
| 5,455,155 | 10/1995 | Brick et al. | 430/566 |
| 5,491,052 | 2/1996 | Van Meter | 430/545 |

FOREIGN PATENT DOCUMENTS

| | | |
|---|---|---|
| 92/28293 | 5/1993 | Australia . |
| 0 374 837 A3 | 6/1990 | European Pat. Off. . |
| 2745893 | 4/1978 | Germany . |
| 55-151544 | 11/1980 | Japan . |
| 61-172810 | 8/1986 | Japan . |
| 63-112519 | 5/1988 | Japan . |
| 3-131355 | 6/1991 | Japan . |
| 4-289856 | 10/1992 | Japan . |
| 1551829 | 9/1979 | United Kingdom . |
| 1570362 | 7/1980 | United Kingdom . |
| WO90/16011 | 12/1990 | WIPO . |

*Primary Examiner*—John M. Husar
*Attorney, Agent, or Firm*—Andrew J. Anderson

[57] ABSTRACT

A fine solid particle aqueous dispersion comprises dispersed particles of a substantially water insoluble nonpolymeric organic compound useful in imaging and a polymeric dispersant having an HLB number of at least 8. The dispersion can be prepared by (a) forming a coarse aqueous slurry of solid particles of said compound and a polymeric dispersant having an HLB number of at least 8; and (b) milling said slurry for a period of time sufficient to provide particles of the desired particle size of less than 0.5 micron.

20 Claims, 1 Drawing Sheet

STABLE AQUEOUS SOLID PARTICLE DISPERSIONS

This is a Divisional of application U.S. Ser. No. 228,971, filed on 18 Apr. 1994 now abandoned.

FIELD OF THE INVENTION

This invention relates to an aqueous solid particle dispersion of a substantially water-insoluble nonpolymeric organic compound useful in imaging, to a process for the preparation of said dispersion, to an imaging element comprising said dispersion and to a process for the preparation of said element.

BACKGROUND OF THE INVENTION

Substantially water-insoluble compounds useful in imaging are generally crystalline solids and are incorporated into imaging materials as dispersions or emulsions. In many cases, the compound useful in imaging is dissolved in one or more organic solvents, and the resulting oily liquid is then dispersed into an aqueous solution containing, optionally, dispersing aids such as surfactants and/or hydrophilic colloids such as gelatin. Dispersal of the oily liquid into the aqueous medium is accomplished using high shearing rates or high turbulence in devices such as colloid mills, ultrasonicators, or homogenizers.

In the art of dispersion making, the use of organic solvents has traditionally been considered necessary to achieve small particle sizes, to achieve stable dispersions, and to achieve the desired reactivity of the compound useful in imaging. Some compounds that might be useful in imaging cannot be dispersed in the above manner, however, because of their poor solubility in most organic solvents. In other cases, the compound of interest may have sufficient solubility in organic solvents, but it may be desirable to eliminate the use of the organic solvent to reduce the attendant adverse effects, for example, to reduce coated layer thickness, to reduce undesirable interactions of the organic solvent with other materials in the imaging element, to reduce risk of fire or operator exposure in manufacturing, or for environmental reasons or to improve the sharpness of the resulting image. These and other disadvantages can be overcome by the use of solid particle dispersions of the compound useful in imaging as described in UK Patent No. 1,570,362 to Langen et al, U.S. Pat. No. 4,006,025 to Swank et al, U.S. Pat. No. 4,294,916 to Postle et al, U.S. Pat. No. 4,294,917 to Postle et al, and U.S. Pat. No. 4,940,654 to Diehl et al.

Techniques for making solid particle dispersions are very different from the techniques used to make dispersions of oily liquids. Typically, solid particle dispersions are made by mixing the crystalline solid of interest with an aqueous solution that may contain one or more stabilizers or grinding aids. Particle size reduction is accomplished by subjecting the solid crystals in the slurry to repeated collisions with beads of hard, inorganic milling media, such as sand, spheres of silica, stainless steel, silicon carbide, glass, zirconium, zirconium oxide, alumina, titanium etc., which fracture the crystals. The bead sizes typically range from 0.25 to 3.0 mm in diameter. Ball mills, media mills, attritor mills, jet mills, vibratory mills, etc. are frequently used to accomplish particle size reduction. Milling techniques are described, for example, in U.S. Pat. Nos. 3,008,657 to Szegvari, 3,075,710 to Feld et al and 3,149,789 to Szegvari.

The stabilization of solid particle dispersions is much more difficult than the stabilization of conventional liquid droplet dispersions. Traditional ionic or nonionic alkyl or aryl stabilizers tend to stabilize liquid dispersions (emulsions) much better than solid particle dispersions. Conventional solid particle aqueous dispersions of photographically useful compounds are prepared using a dispersants such as a small molecule anionic surfactant or certain homopolymer surfactants in water. The dispersant, ideally should prevent flocculation of the dye particles upon milling down to the desired size (generally less than about 0.2 microns).

Problem to be Solved by the Invention

A problem inherent to certain compounds useful in imaging, for example, hydrophobic dyes, such as the polymethine dyes, is their severe hydrophobicity coupled with the presence of ionogenic groups such as carboxylic, hydroxyl etc. Using conventional anionic small molecule surfactants or certain homopolymer surfactants these dyes cannot be dispersed in water at concentrations higher than about 5 weight % to yield stable finely divided solid particle dispersions. The viscosities of the dispersions tend to rise with decreasing particle size due to interparticle interaction leading to flocculation. It has been found that the protection provided by the small molecule surfactant or certain homopolymer surfactants against flocculation is insufficient.

SUMMARY OF THE INVENTION

One aspect of the present invention comprises a fine solid particle aqueous dispersion which comprises dispersed solid particles of a substantially water-insoluble nonpolymeric compound useful in imaging and a polymeric dispersant having an HLB (hydrophilic/lipophilic balance) number of at least 8. Preferably, the dispersant is selected from the group of amphipathic water-dispersible or water-soluble polymers represented by the generic structures shown below:

| A—B | A—B—A | —[B]$_m$—[C]$_n$—<br>        |<br>        A | and (AB)$_x$Q(BA)$_z$ |
|---|---|---|---|
| I | II | III | IV | wherein each A independently represents 1 to about 150 repeat units of a water soluble component, B and C each represent a linear or branched alkyl, aryl, alkaryl or cyclic alkyl radical containing at least 7 carbon atoms, or 3 to about 100 repeat units of a propylene oxide or higher alkylene oxide or combinations thereof, Q represents a multivalent linking group m=50–100 mole % and n=1–50 mole % with the proviso that m+n=100 mole %, x=1 or 2 and z=1 or 2.

Another aspect of this invention comprises a process for the preparation of a fine solid particle aqueous dispersion of a substantially water-insoluble nonpolymeric organic compound useful in imaging which comprises the steps of:

(a) forming a coarse aqueous slurry of solid particles of said compound and a polymeric dispersant having an HLB number of at least 8; and (b) milling said slurry for a period of time sufficient to provide particles of the desired particle size of less than 0.5 micron.

A further aspect of this invention comprises an imaging element comprising a support having thereon at least one layer comprising a dispersion as described above in an imaging vehicle.

Yet another aspect of this invention comprises a process for the preparation of an imaging element which comprises steps of dispersing a solid particle dispersion described above in an imaging vehicle and coating the resulting composition onto a support.

Advantageous Effect of the Invention

This invention utilizes polymeric dispersants having an HLB value of at least 8, preferably amphipathic block copolymers, that enable fine particle aqueous dispersions of substantially water insoluble nonpolymeric organic compounds useful in imaging to be prepared at relatively high concentrations without adverse effects on the rheology of the dispersion and colloidal stability. A further advantage of such dispersions is that they can be mixed with imaging vehicles such as aqueous solutions of a film-forming hydrophilic binder, for example a hydrophilic colloid, such as gelatin, without adverse effects on the degree of flocculation or the viscosity of the resulting mixture. A still further advantage of such dispersions is that they do not in general adversely interact with photographic emulsions.

DETAILED DESCRIPTION OF THE INVENTION

Figure 1:
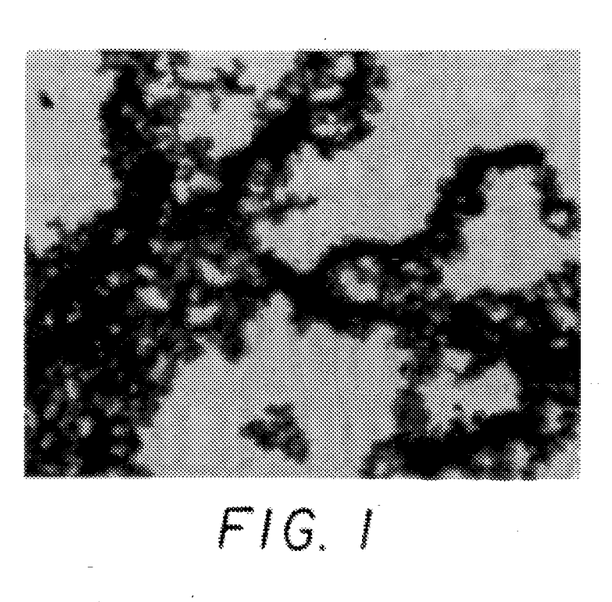
FIG. 1 is a photomicrograph of dye D7 dispersed, using PVP, as set forth below in Example 1 at 1110× magnification.
Figure 2:
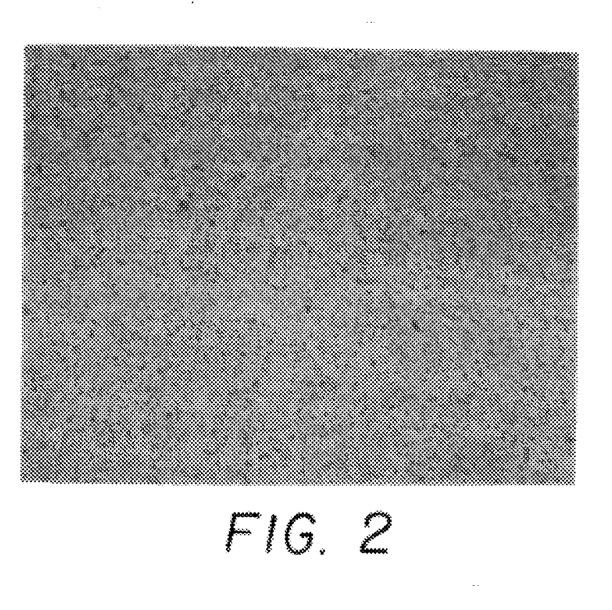
FIG. 2 is a photomicrograph of dye D7 dispersed using Syn Fac 8210, as set forth below in Example 1 at 1110× magnification.

The stable, solid particle dispersion of this invention comprises dispersed solid particles of a substantially water insoluble, nonpolymeric, organic compounds useful in imaging. The compound useful in imaging dispersed in accordance with this invention can be, for example, a coupler, filter dye, sensitizing dye, thermal transfer dye, UV absorbing dye, oxidized developer scavenger, and the like. Examples of such compounds can be found in Research Disclosure, December 1989, Item 308,119 published by Kenneth Mason Publications, Ltd., Dudley Annex, 12a North Street, Emsworth, Hampshire P010 7DQ, England, Sections VII and VIII, which are incorporated herein by reference. Typical preferred compounds useful in imaging that can be used in solid particle dispersions in accordance with this invention are described below.

D-1

D-2

D-3

(n = 0)

D-4 (n=1)

D-5 (n=2)

D-6

D-7

D-8

D-9

-continued

D-10 n = 0–2, R = C2–C10 alkyl, aryl
D-11

D-12

D-13

D-14

-continued

D-15

D-16

D-17

D-18

It is to be understood that this list is representative only, and not meant to be exclusive. In particularly preferred embodiments of the invention, the compound useful in imaging is a sensitizing dye, thermal transfer dye or filter dye.

In general, filter dyes that can be used in accordance with this invention are those described in European patent applications EP 549,089 of Texter et al, and EP 430,180 and U.S. Patent Nos. U.S. Pat. No. 4,803,150; U.S. Pat. No. 4,855,221; U.S. Pat. No. 4,857,446; U.S. Pat. No. 4,900,652; U.S. Pat. No. 4,900,653; U.S. Pat. No. 4,940,654; U.S. Pat. No. 4,948,717; U.S. Pat. No. 4,948,718; U.S. Pat. No. 4,950,586; U.S. Pat. No. 4,988,611; U.S. Pat. No. 4,994,356; U.S. Pat. No. 5,098,820; U.S. Pat. No. 5,213,956; U.S. Pat. No. 5,260,179; and U.S. Pat. No. 5,266,454; (the disclosures of which are incorporated herein by reference).

In general, thermal transfer dyes that can be used in accordance with this invention include anthraquinone dyes, e.g., Sumikaron Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumikaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumiacryl Blue 6G® (product of Sumitomo Chemical Co., Ltd.), and Aizen Malachite Green® (product of Hodogaya Chemical Co., Ltd.); or any of the dyes disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference.

In general, sensitizing dyes that can be used in accordance with this invention include cyanine dyes, merocyanine dyes, complex cyanine dyes, complex merocyanine dyes, homopolar cyanine dyes, hemicyanine dyes, styryl dyes, and hemioxonol dyes. Of these dyes, cyanine dyes, merocyanine dyes and complex merocyanine dyes are particularly useful.

Any conventionally utilized nuclei for cyanine dyes are applicable to these dyes as basic heterocyclic nuclei. That is, a pyrroline nucleus, an oxazoline nucleus, a thiazoline nucleus, a pyrrole nucleus, an oxazole nucleus, a thiazoline nucleus, a selenazole nucleus, an imidazole nucleus, a tetrazole nucleus, a pyridine nucleus, etc., and further, nuclei formed by condensing alicyclic hydrocarbon rings with these nuclei and nuclei formed by condensing aromatic hydrocarbon rings with these nuclei, that is, an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc., are appropriate. The carbon atoms of these nuclei can also be substituted.

The merocyanine dyes and the complex merocyanine dyes that can be employed contain 5- or 6-membered heterocyclic nuclei such as pyrazolin-5-one nucleus, a thiohydantoin nucleus, a 2-thioxazolidin-2,4-dione nucleus, a thiazolidine-2,4-dione nucleus, a rhodanine nucleus, a thiobarbituric acid nucleus, and the like.

Solid particle dispersions of sensitizing dyes may be added to a silver halide emulsion together with dyes which themselves do not give rise to spectrally sensitizing effects but exhibit a supersensitizing effect or materials which do not substantially absorb visible light but exhibit a supersensitizing effect. For example, aminostilbene compounds substituted with a nitrogen-containing heterocyclic group (e.g., those described in U.S. Pat. Nos. 2,933,390 and 3,635,721), aromatic organic acid-formaldehyde condensates (e.g., those described in U.S. Pat. No. 3,743,510), cadmium salts, azaindene compounds, and the like, can be present.

The sensitizing dye may be added to an emulsion comprising silver halide grains and, typically, a hydrophilic colloid at any time prior to (e.g., during or after chemical sensitization) or simultaneous with the coating of the emulsion on a photographic support). The dye/silver halide emulsion may be mixed with a dispersion of color image-forming coupler immediately before coating or in advance of coating (for example, 2 hours). The above-described sensitizing dyes can be used individually, or may be used in combination, e.g. to also provide the silver halide with additional sensitivity to wavelengths of light outside that provided by one dye or to supersensitize the silver halide.

The dispersed solid particles preferably have a particle size of less than 0.5 micron, preferably less that about 0.3 micron. In preferred embodiments of the invention the dispersed particles have a particle size of between 0.01 to about 1.0 microns, more preferably 0.01 to 0.5 and most preferably 0.05 to 0.3 micron.

The solid particle dispersion is prepared by forming a coarse slurry of particles of said compound and a polymeric dispersant having an HLB number of at least 8. In the coarse slurry the particles have an average particle size of about 2 to about 5000 μm preferably 2 to about 1000 μm and more preferably 2 to about 600 μm. The HLB number of a polymer is a measure of the hydrophilic/lipophilic balance of the polymer and can be determined as described in "Polymeric Surfactants", Surfactant Science Series, Volume 42, page 221, by I. Piirma.

The general class of preferred dispersants are those which are water soluble or dispersible and are represented by one of the following structures.

| | | | |
|---|---|---|---|
| I | II | III | IV | wherein each A independently represents 1 to about 150 repeat units of a water soluble component, B and C each represent a linear or branched alkyl, aryl alkaryl or cyclic alkyl radical containing at least 7 carbon atoms, or 3 to about 100 repeat units of a propylene oxide or higher alkylene oxide or combinations thereof, Q represents a multivalent linking group m=50–100 mole % and n=1–50 mole %, with the proviso that m+n=100 mole %, x=1 or 2 and z=1 or 2.

A is preferably a poly(ethylene oxide) unit, but can be any other water soluble unit, such as polyethyloxazoline, poly (vinyl alcohol), poly(vinyl pyrrolidone) or the like. B and C are radicals containing at least 7 carbon atoms, preferably 7 to 500 carbon atoms and more preferably, 15 to 300 carbon atoms. Illustrative radicals include, for example, C20–C50 alkyl, copolymer of maleic anhydride and alkene, arylphenoxy, alkylphenoxy, poly(propylene oxide), poly (butylene oxide), or the like. Q is a multivalent linking group having the valence of x+z. Preferably Q is a polyamine such as ethylene diamine, tetramethylene diamine, etc., a poly hydroxy compound, such as pentaerythritol, or the like.

Generally, dispersants useful in the present invention are well known in the art and some of them are commercially available. Typically the dispersant comprises water soluble or dispersible block copolymers either linear or branched. Preferred dispersants comprise various poly(ethylene oxide) containing block copolymers. Examples of preferred dispersants are illustrated for example by the ethoxylated compounds as listed below.

| Trade Name | Manufacturer | Chemical Identification | HLB |
|---|---|---|---|
| Unithox Ethoxylates | Petrolite | ethoxylated C24–C50 n-alkane alcohols | 10–16 |
| Dapral GE202 | Akzo | partial ester of a branched carboxylic acid copolymer | >10 |
| Tetronic 908 | BASF Corporation | block copolymer of poly(ethylene oxide) and poly(propylene oxide) | >24 |
| Syn Fac 334 | Milliken Chemical | Arylphenol ethoxylate | 11 |
| Syn Fac 8216 | Milliken Chemical | Arylphenol ethoxylate | 15 |
| Syn Fac 8210 | Milliken Chemical | Polyalkoxylated arylphenol | 11 |
| Syn Fac 8337 | Milliken Chemical | Potassium salt of a phosphated alkoxylated arylphenol | 20 |

More specifically, illustrative preferred dispersants have the following structures:

$x = C_{24}-C_{50}$
$z = 8-20$

$M = H, SO_3^-X^+, \text{ or } PO_3^{2-}2X^+$
where X is cation such as
$Na^+, K^+, NH_4^+$, etc.

$n = 10-25$

-continued

R = aryl, alkyl, aralkyl
M = H, $SO_3^-X^+$, or $PO_3^{2-}2X^+$
where X is cation such as
$Na^+$, $K^+$, $NH_4^+$, etc.

n = 10–20
x = 7–8

PEO = poly(ethylene oxide)
PPO = poly(propylene oxide)

The preferred dispersants are amphipathic in nature. Such a dispersant comprises in its structure an oleophilic group of sufficient length to adsorb firmly to the surface of the dispersed particles and also comprises a hydrophilic group of sufficient length to provide a large enough steric barrier to interparticle attraction. The dispersant may be nonionic or ionic in nature.

These amphipathic dispersants are generally block copolymers, either linear or branched and have segmented hydrophilic and oleophilic portions. The hydrophilic segment may or may not comprise ionic groups and the oleophilic segment may or may not comprise polarizable groups. The dispersants utilized in the present invention are believed to function essentially as steric stabilizers in protecting the dispersion against formation of elastic and other flocs leading to increased viscosity of the aqueous dispersion. The polarizable groups, if present, in the oleophilic segment of the polymer further enhance association of the dispersant through these anchoring sites with certain flocculation-prone solid particles that are polar in nature.

The stabilized dispersion of this invention can be prepared by mixing together a block copolymer dispersant, described above, and a coarse aqueous slurry of the desired solid compound useful in imaging. The resulting mixture is then loaded into a mill. The amount of dispersant used is generally in the range of about 0.1 to about 200%, preferable about 5 to about 75% and more preferably about 10 to about 50%, the percentages being by weight, based on the weight of the compound useful in imaging.

The mill used can be for example a colloid mill, swinging mill, ball mill, media mill, attritor mill, jet mill, vibratory mill or the like. The mill can be charged with the appropriate milling media such as, for example, beads of silica, silicon nitride, sand, zirconium oxide, alumina, titanium, glass, etc. The bead sizes typically range from 0.25 to 3.0 mm in diameter. The slurry is then added to the mill where repeated collisions of the milling media with the solid crystals in the slurry of the compound useful in imaging result in crystal fracture and consequent particle size reduction. The length of time required to mill the particles to the desired particle size depends on the milling device used. Generally, the desired particle size can be achieved by milling the slurry for 30 minutes to 31 days, preferably 60 minutes to 14 days, depending on the mill used.

Additional components, for example, additional imaging compounds, defoaming agents including but not limited to, other copolymer dispersions can be present during the milling step. In particular, it may be advantageous to include an ionic small molecule (i.e. nonpolymeric) surfactant for providing added stability through ionic repulsions. These act as antiflocculating agents and are usually ionic in nature. They can be added before or after the milling step. Representative examples of small molecular surfactants are listed below.

SMS-1 a mixture of:

SMS-2 and

SMS-3

SMS-4

SMS-5

SMS-6

SMS-7

SMS-8 where R = $C_{12}$ branched

SMS-9 where R = —$CH(CH_3)C_4H_9$

-continued where R = —CH₂—CH₂—    SMS-10

SMS-11 where R = —CH₂—CH—CH₃ where R = —CH₂—CH(CH₂CH₃)C₃H₇   SMS-12 where R = —(CH₂)ₙCH₃ (n = 2,3&5)   SMS-13

SMS-14 where R = —(CH₂)ₙ— (n = 2–5)

SMS-15 t-C₄H₉—CH₂C(CH₃)₂— ⟨ring⟩ —OCH₂CH₂OCH₂CH₂—SO₃⁻Na⁺

The resulting dispersion of the compound useful in imaging can then be added to an aqueous medium, if desired, for coating, onto a photographic support. The aqueous medium preferably contains other components, such as stabilizers and dispersants, for example, anionic, nonionic, zwitterionic, and cationic surfactants, gelatin and/or other hydrophilic colloids, such as polyvinyl pyrrolidone, polyvinyl alcohol, polyethylene oxide, cellulose, copolymers of polyvinyl pyrrolidone and acrylic acid, polyacrylamide, etc.

The resulting solid particle dispersions can be used in the preparation of an imaging element comprising a support, such as paper or film, having coated thereon at least one imaging layer. The dispersion can be coated as a component of a non-imaging layer, such as an interlayer, antihalation layer or the like. In other embodiments, the dispersion is mixed with imaging components, such as a silver halide emulsion, and coated as an imaging layer onto the support. If desired, the dispersion can be stored either separately or as a mixture with other components until needed.

Methods of preparing imaging elements, are well known in the art. For example, the preparation of single and multilayer imaging elements is described in Research Disclosure 308119 dated December 1989, the disclosure of which is incorporated herein by reference.

The solid particle dispersions of this invention are used in coated layers of imaging elements. Generally, the dispersion is added to a vehicle such as an aqueous solution of a film-forming binder, such as a hydrophilic colloid. Illustrative hydrophilic binders include water-soluble polymers, cellulose esters, latex derivatives, casein, agar, sodium alginate, starch, polyvinyl alcohol, polyacrylic acid copolymers and maleic anhydride copolymers and mixtures thereof. The cellulose esters include hydroxyl propyl cellulose, carboxymethyl cellulose and hydroxyethyl cellulose. The latex polymers include vinyl chloride copolymers, vinylidene chloride copolymers, acrylic ester copolymers, vinyl acetate copolymers and butadiene copolymers. Among them, gelatin is most preferred.

Typical photographic elements (and materials, supports, etc. useful in the preparation thereof) in which the solid particle dispersions of this invention can be incorporated are disclosed in above-noted Research Disclosure 308,119, incorporated herein by reference.

The support of image forming elements of this invention can be coated with a magnetic recording layer as discussed in Research Disclosure 34390 of November 1992, the disclosure of which is incorporated herein by reference.

A preferred photographic element according to this invention is described below:

| Protective Overcoat Layer | |
|---|---|
| poly(dimethyl siloxane) 200-CS, | 0.0659 g/m² |
| poly(methyl methacrylate) beads, | 0.0050 g/m² |
| gelatin, | 0.9763 g/m² |
| Green Sensitized Layer | |
| AgClBr cubic grain emulsion, 25% Br, 0.15 μm, sensitized with dye cpd 1, 0.5078 mmole/Ag mole, supersensitizer cpd 2, 1.1212 mmole/Ag mole, | 0.4553 g/m². |
| AgClBr cubic grain emulsion, 25% Br, 0.24 μm, sensitized with dye cpd 1, 0.4785 mmole/Ag mole, supersensitizer cpd 2, 1.3902 mmole/Ag mole, | 0.0291 g/m². |
| Magenta dye forming coupler, cpd 3, | 0.6997 g/m². |
| Oxidized developer scavenger, cpd 4, | 0.0538 g/m². |
| Filter dye, cpd 5, | 0.03229 g/m². |
| Filter dye, cpd 6, | 0.0506 g/m². |
| Gelatin, | 2.0775 g/m². |
| Interlayer | |
| Oxidized developer scavenger, cpd 4, | 0.0753 g/m² |
| Gelatin, | 0.6103 g/m². |
| Red Sensitized Layer | |
| AgClBr cubic grain emulsion, 25% Br, 0.15 μm, sensitized with dye cpd 7, 0.1808 mmole/Ag mole, supersensitizer, cpd 2, 0.6327 mmole/Ag mole, | 0.4069 g/m². |
| AgClBr cubic grain emulsion, 25% Br, 0.24 μm, sensitized with dye cpd 7, 0.1808 mmole/Ag mole, supersensitizer, cpd 2, 0.7444 mmole/Ag mole, | 0.0452 g/m². |
| Cyan dye forming coupler, cpd 8, | 0.9688 g/m². |
| Oxidized developer scavenger, cpd 4, | 0.0129 g/m². |
| Filter dye, cpd 9, | 0.1109 g/m². |
| Gelatin | 3.4122 g/m². |
| Interlayer | |
| Oxidized developer scavenger, cpd 4, | 0.0753 g/m² |
| Gelatin, | 0.0103 g/m². |
| Blue Sensitized Layer | |
| AgCl cubic grain emulsion, 0.58 μm, sensitized with dye cpd 10, 0.3336 mmole/Ag mole, | 0.6458 g/m². |
| AgCl cubic grain emulsion 0.76 μm, sensitized with dye cpd 10, 0.2669 mmole/Ag mole, | 0.2153 g/m². |
| Yellow dye forming coupler cpd 11, | 1.8837 g/m². |
| Yellow dye cpd 12, | 0.0323 g/m². |
| Filter dye cpd 13, | 0.0108 g/m². |
| Sequestrant cpd 14, | 0.3059 g/m². |
| Sequestrant cpd 15, | 0.1000 g/m². |
| Gelatin | 3.1646 g/m². |
| Antihalation Layer | |
| Yellow filter dye, cpd 16 | 0.0431 g/m². |
| Cyan filter dye, (D-5) | 0.1076 g/m². |
| Gelatin | 1.0764 g/m². |
| Support | |
| Polyethylene terephthalate with an antistat on side opposite emulsion side | |

The following structures represent the compounds utilized in the above photographic element.

Compound 1

Compound 2

Compound 3

Compound 4

Compound 5

Compound 6

Compound 7

Compound 8

Compound 9

Compound 10

Compound 11

Compound 12

Compound 13

Compound 14

Compound 15

Compound 16

In image forming elements, the solid particle dispersions of this invention can be used as filter dyes to absorb light from different regions of the spectrum, such as red, green, blue, ultraviolet and infrared light. These filter dyes are often required to perform the function of absorbing light during the exposure to the photographic element so as to prevent or at least inhibit light of a certain region of the spectrum from reaching at least one of the radiation sensitive layers of the element. The solid particle filter dye dispersion is typically coated in an interlayer between dye-forming layers, or in an antihalation layer directly above the support. Filter dyes of this type are usually solubilized and removed or at least decolorized during photographic processing. Details of such materials are given in U.S. Pat. No. 4,900,653 to Factor and Diehl, the entire disclosures of which are incorporated herein by reference. The thermal transfer dyes of this invention are used in coated layers of thermal transfer imaging elements in donor materials and provide a source of thermally mobile image dye that transfers imagewise onto an appropriate receiver material.

The support of image forming elements of this invention can be coated with a magnetic recording layer as discussed in Research Disclosure 34390 of November 1992, the disclosure of which is incorporated herein by reference.

Illustrative compounds useful in imaging which can be dispersed in aqueous media in accordance with this invention include, for example, couplers, DIR's, DI(A)R's, sensitizing dyes, filter dyes, UV absorbers, antioxidants, oxidized developer scavengers, trimmer dyes, anti-stain agents, anti-fade agents, silver halide developing agents, toners and pigments for electrophotography, and silver halide emulsion addenda such as sensitizing dyes and antifoggants. A discussion of compounds useful in imaging can be found in above mentioned Research Disclosure 308119 dated December 1989.

The following examples illustrate the preparation of stabilized solid particle dispersions in accordance with this invention.

EXAMPLE 1

A dispersion of thermal transfer dye was made by placing 2.4 g of compound D7 in a 4 oz glass jar containing 3.6 g of a 10% aqueous solution of dispersant Syn Fac 8210, 18.0 g distilled water and 60 ml of 1.8 mm zirconium oxide beads. A second dispersion was made by placing 2.4 g of compound D7 in an 4 oz glass jar containing 3.6 g of a 10% aqueous solution of dispersant Tetronic 908, 18.0 g of distilled water and 60 ml of 1.8 mm of zirconium oxide beads. A control dispersion was made by placing 2.4 g of compound D7 in an 4 oz glass jar containing 3.6 g of a 10% aqueous solution of PVP (polyvinylpyrrolidone), 18.0 g distilled water and 60 ml of 1.8 mm zirconium oxide beads. All three jars were rolled at a speed of 65 feet/minute for 10 days. After milling, each dispersion was separated from the milling beads, and the dispersion viscosity and stability to flocculation was evaluated. Results are given in Table I.

TABLE I

| Dispersant | Observations After Milling |
| --- | --- |
| PVP (control) | highly viscous, flocculated |
| Syn Fac 8210 (invention) | nonviscous, nonflocculated |
| Tetronic 908 (invention) | nonviscous, nonflocculated |

Results from Table I show that the dispersions of compound D7 with dispersant Syn Fac 8210 and dispersant Tetronic 908 are more stable to viscosity build-up and flocculation compared to the control dispersion made with PVP.

EXAMPLE 2

A dispersion of a filter dye was made by placing 4.0 g of compound D1 in an 8 oz glass jar containing 2.0 g of dispersant Dapral GE202, 0.9 g of a 45% aqueous solution of a small molecule surfactant sodium dodecyl diphenyloxide disulfonate, (SMS-8) 43.1 g distilled water, and 125 ml of 1.8 mm zirconium oxide beads. A second dispersion was made by placing 5.0 g of compound D1 in an 8 oz glass jar containing 17.5 g of a 10% aqueous solution of an ethoxylated n-alkane alcohol having a molecular weight of 2250, containing 80 weight % PEO and having an HLB number of 16 (Unithox 480), 27.5 g distilled water and 125 ml of 1.8 mm zirconium oxide beads. A control dispersion was made by placing 4.0 g of compound D1 in an 8 oz glass jar containing 9.0 g of a 6.7% aqueous solution of octyl phenoxy polyethylene oxide sulfonate, (SMS-2), 37.0 g distilled water and 125 ml of 1.8 mm zirconium oxide beads. All three jars were placed on a SWECO vibratory mill for 3 days. After milling, each dispersion was separated from the milling beads, and the dispersion viscosity and stability to flocculation was evaluated. Results are given in Table II.

TABLE II

| Dispersant | Observations After Milling |
| --- | --- |
| SMS-2 (control) | highly viscous, flocculated |
| Dapral GE202 + SMS-8 (invention) | nonviscous, nonflocculated |
| Unithox 480 (invention) | nonviscous, nonflocculated |

Results from Table I show that the dispersion of compound D1 with dispersant Unithox 480 and dispersants Dapral GE202+SMS-8 are more stable to viscosity build-up and flocculation compared to the control dispersion made with SMS 2.

EXAMPLE 3

A dispersion of a filter dye was made by placing 8.0 g of compound D4 in an 8 oz glass jar containing 2.0 g of dispersant Tetronic 908, 40.0 g distilled water, and 125 ml of 1.8 mm zirconium oxide beads. A second dispersion was made by placing 8.0 g of compound D4 in an 8 oz glass jar containing 3.84 g of a 25% aqueous solution of an ethoxylated n-alkane alcohol having a molecular weight of 1100, containing 50 weight % PEO and having an HLB number of 10 (Unithox 550), 0.48 g SMS-1, 37.68 g distilled water and 125 ml of 1.8 mm zirconium oxide beads. A control dispersion was made by placing 8.0 g of compound D4 in an 8 oz glass jar containing 2.0 g SMS-1, 40.0 g distilled water and 125 ml of 1.8 nun zirconium oxide beads. All three jars were placed on a SWECO vibratory mill for 4 days. After milling, each dispersion was separated from the milling beads, and the dispersion viscosity and stability to flocculation was evaluated. Results are given in Table III.

TABLE III

| Dispersant | Observations After Milling |
| --- | --- |
| SMS - 1 (control) | highly viscous, flocculated |
| Tetronic 908 (invention) | nonviscous, nonflocculated |
| Unithox 550 + SMS-1 (invention) | nonviscous, nonflocculated |

Results from Table III show that the dispersions of compound D4 with dispersant Tetronic 908 and dispersants Unithox 550+SMS-1 are more stable to viscosity build-up and flocculation compared to the control dispersion made with dispersant SMS-1.

EXAMPLE 4

A dispersion of a filter dye was made by placing 5.0 g of compound D5 in an 8 oz glass jar containing 17.5 g of dispersant Syn Fac 8216, 27.5 g distilled water, and 12 5 ml of 1.8 mm zirconium oxide beads. A control dispersion was made by placing 4.0 g of compound D5 in an 8 oz glass jar containing 0.4 g SMS-1 45.6 g distilled water and 125 ml of 1.8 mm zirconium oxide beads. Each jar was placed on a SWECO vibratory mill for 4 days. After milling, the dispersion containing dispersant Sin Fac 8216 was diluted to 8% dye with distilled water, and each dispersion was separated from the milling beads. The viscosity and stability to flocculation of each dispersion was evaluated. Results are given in Table IV.

TABLE IV

| Dispersant | Observations After Milling |
| --- | --- |
| SMS-1 (control) | highly viscous, flocculated |
| Syn Fac 8216 (invention) | nonviscous, nonflocculated |

Results from Table IV show that the dispersion of compound D5 with dispersant Sin Fac 8216 is more stable to viscosity build-up and flocculation compared to the control dispersion made with SMS-1.

EXAMPLE 5

A dispersion of a sensitizing dye was made by combining 5.0 g of compound D9 with 0.75 g dispersant Dapral GE202 and 44.25 g distilled water to give a concentration of 10% dye, 1.5% dispersant Dapral GE202) and 88.5% distilled water. The slurry was milled in a glass jar filled 50% by volume with 1.8 mm zirconium oxide beads. A control dispersion was made by combining 5.04 g of compound D9 with 3.59 g of a 21% by weight solution of SMS-2 and 41.44 g of distilled water to give a concentration of 10% dye, 1.5% SMS-2 and 88.5% distilled water. The slurry was milled in a glass jar filled 50% by volume with 1.8 mm zirconium oxide beads. At the end of the milling period, the entire contents of each jar was poured onto a 1 mm sieve and the amount of slurry separated from the media, expressed by percent of the theoretical total (% yield) was measured. Results are given in Table V.

TABLE V

| Dispersant | % Yield After Milling |
| --- | --- |
| SMS-2 (control) | 4.8 |
| Dapral GE202 (invention) | 79.4 |

Results from Table V show the dispersion of compound D9 prepared with Dapral GE202 gives a significantly higher dispersion yield compared to the control dispersion prepared with SMS-2.

The invention has been described in detail with particular reference to preferred embodiments thereof, but it is to be understood that variations and modifications can be effected within the spirit and scope of the invention.

What is claimed is:

1. A process for the preparation of a fine solid particle aqueous dispersion of a substantially water-insoluble non-polymeric organic compound useful in imaging selected from filter dyes, sensitizing dyes, and thermal transfer dyes, which comprises the steps of:

(a) forming a coarse aqueous slurry of solid particles of said compound and an amphipathic water-soluble or water-dispersible block polymeric dispersant having an HLB number of at least 8; and (b) milling said slurry for a period of time sufficient to provide particles of the desired particle size of less than 0.5 micron.

2. A process of claim 1 which further comprises the step of adding a small molecule surfactant to the slurry prior to the milling step.

3. A process of claim 2, wherein said small molecule surfactant is sodium dodecyl diphenyloxide disulfonate.

4. A process of claim 1, wherein a small molecule surfactant is added to the dispersion after the milling step.

5. A process of claim 4, wherein said small molecule surfactant is sodium dodecyl diphenyloxide disulfonate.

6. A process of claim 1 wherein the dispersant is selected from the group of amphipathic water-soluble or water-dispersible polymers represented by one of the following structures:

| A—B | A—B—A | —[B]$_m$—[C]$_n$—<br>\|<br>A | and (AB)$_x$Q(BA)$_z$ |
|---|---|---|---|
| I | II | III | IV | wherein each A independently represents 1 to about 150 repeat units of a water soluble component; B and C each represent a linear or branched alkyl, aryl, alkaryl or cyclic alkyl radical containing at least 7 carbon atoms, or 3 to about 100 repeat units of a propylene oxide or higher alkylene oxide or combinations thereof; Q represents a multivalent linking group; m=50–100 mole % and n=1–50 mole %; with the proviso that m+n=100 mole %, x=1 or 2 and z=1 or 2.

7. A process of claim 1, wherein the dispersant is of the formula:

$$CH_3(CH_2)_x(OCH_2CH_2)_zOM$$
$$x = C_{24}-C_{50}$$
$$z = 8-20$$
$$M = H, SO_3^-X^+, \text{ or } PO_3^{2-}2X^+$$
where X is cation;

n = 10–25
R = aryl, alkyl, aralkyl
M = H, SO$_3^-$X$^+$, or PO$_3^{2-}$2X$^+$
where X is cation;

n = 10–20
x = 7–8;

-continued or

PEO = poly(ethylene oxide)
PPO = poly(propylene oxide).

8. A process of claim 6, wherein the dispersant is a polyalkoxylated hydrocarbon.

9. A process of claim 6, wherein the dispersant is a partial ester of a branched carboxylic acid copolymer.

10. A process of claim 6, wherein the dispersant is a block copolymer of polyethylene oxide and polypropylene oxide.

11. A process of claim 6, wherein each A repeat unit is selected from poly(ethylene oxide) units, polyethyloxazoline units, poly(vinyl alcohol) units, and poly(vinyl pyrrolidone) units.

12. A process of claim 6, wherein each A independently represents 1 to about 150 repeat poly(ethylene oxide) units.

13. A process of claim 1, wherein said slurry comprises from about 5 to about 75 wt. % of said dispersant based upon the weight of the compound useful in imaging.

14. A process of claim 1, wherein said compound useful in imaging is a filter dye.

15. A process of claim 14, wherein the dispersant is a block copolymer of polyethylene oxide and polypropylene oxide.

16. A process of claim 15, wherein said slurry comprises from about 5 to about 75 wt % of said dispersant based upon the weight of the compound useful in imaging.

17. A process of claim 1, wherein said dye has the formula:

D-1

D-2

D-3 (n=0)

D-4 (n=1)

D-5 (n=2)

D-6

D-7

-continued

D-8

D-9

D-10

D-11 n = 0–2, R = C2–C10 alkyl, aryl

D-12

D-13

-continued

D-14

D-15

D-16

D-17 or

D-18

18. A process of claim 1, wherein the dispersant is a block copolymer of polyethylene oxide and polypropylene oxide.

19. A process of claim 18, wherein said slurry comprises from about 5 to about 75 wt % of said dispersant based upon the weight of the compound useful in imaging.

20. A process of claim 1, wherein the dispersant is a partial ester of a branched carboxylic acid copolymer.

* * * * *